(No Model.)

F. E. YOUNGS.
BICYCLE HANDLE.

No. 471,932. Patented Mar. 29, 1892.

WITNESSES
Geo. E. Frech.
Roland Fitzgerald

INVENTOR
F. E. Youngs
per
Lehmann & Pattison
attys.

UNITED STATES PATENT OFFICE.

FRED E. YOUNGS, OF ALLEGHENY, PENNSYLVANIA.

BICYCLE-HANDLE.

SPECIFICATION forming part of Letters Patent No. 471,932, dated March 29, 1892.

Application filed October 10, 1891. Serial No. 408,346. (No model.)

*To all whom it may concern:*

Be it known that I, FRED E. YOUNGS, of Allegheny, in the county of Allegheny and State of Pennsylvania, have invented certain new and useful Improvements in Bicycle-Handles; and I do hereby declare the following to be a full, clear, and exact description of the invention, such as will enable others skilled in the art to which it pertains to make and use it, reference being had to the accompanying drawings, which form part of this specification.

My invention relates to an improvement in bicycle-handles; and it consists in the novel features, which will be fully described hereinafter, and particularly pointed out in the claims.

The object of my invention is to insulate or prevent the vibration in all directions of the steering-head of the bicycle from being transmitted to the hands and arms of the rider.

In many parts of the country where the bicycle is used the roads are so rough that even with the most perfect machines the vibration of the handles and steering-head is so great as to cause the arms of the rider to become numb and sometimes to ache for hours. This is particularly the case in cities where the principal paving is what is called "block stone," and as most cities do not permit the bicyclist to ride on the sidewalks the pleasure of long or even rides as short as three or four miles is very much marred by the numbness and aching of the arms afterward. My invention, which is intended to overcome this difficulty, I will now describe, referring for greater clearness to the drawings, of which—

Figure 1:
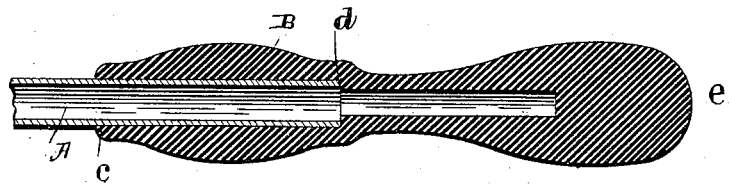
Figure 2:
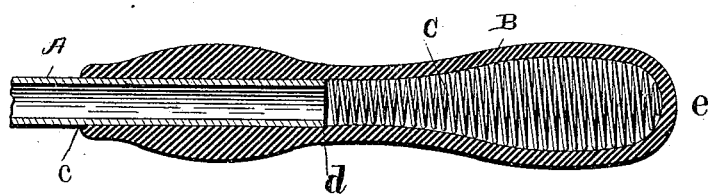
Figure 3:
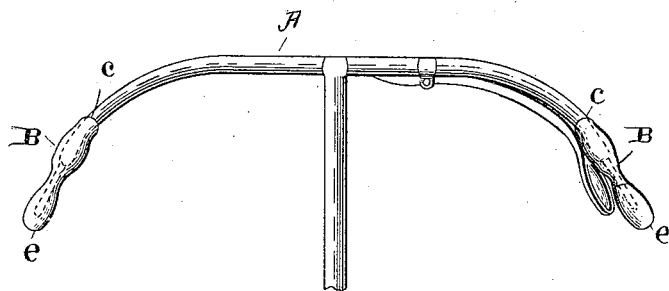

Figure 1 is a longitudinal section of a handle embodying my invention. Fig. 2 shows another form of the same type of handle. Fig. 3 shows the steering-head of a bicycle to which my invention is applied.

In Fig. 3, A represents the handle-bar or steering-head of a bicycle. B represents the insulating-handles, which are made wholly or in part of rubber or other similar elastic material and extend for a short distance onto and covering the ends of the handle-bar, forming a socket, as shown, from $c$ to $d$. The elastic material of the handles also extends beyond the ends of the handle-bar from $d$ to $e$ a distance sufficient to make a perfectly flexible handle entirely independent of the jar and vibration of the handle-bar itself. The elastic material of the handles is not made so soft and pliable as to destroy the proper control of the machine on block stone or other rough paving, but at the same time it is soft enough to prevent the jar and vibration from being felt to any degree. The part of the handle covering the ends of the handle-bar itself may be used, if necessary, on rough or cut-up roads requiring better control of the machine than is afforded by the flexible handles; but this is very rarely done and not absolutely necessary.

The flexible part of the handle $d\ e$ may be enlarged in diameter, as shown, or it may be checkered and ornamented in any way desired so as to roughen its surface and prevent the tendency of the hands to slip off from the end of the handles.

The handles are preferably made hollow from $c$ to a point near the end $e$, as shown. This is to permit its being readily cemented to the handle-bar and also to save weight of rubber, which is an expensive material. Where still greater cheapness is required, the rubber beyond the end of the handle-bar may be made much thinner than is shown in Fig. 1, and a small stiff wire C, coiled up in the form of a spring and placed inside of the handle, as shown in Fig. 2, so as to keep the rubber out to its proper size for a handle and still allow the same flexibility as the more expensive form.

It is evident that while throughout this specification the handle is spoken of in connection with the bicycle it is also applicable to the tricycle and to many places in other forms of mechanism or machinery wherever it may be desirable to insulate the hand of the operative from the vibrations of the machine.

I am aware that soft-rubber handles have heretofore been placed upon the handle of a bicycle; but in these cases the hand-holds thereof have been at a point opposite the stiff-metal handle and only prevent the vibration owing to their softness. My invention differs essentially from these devices in that my hand-hold is wholly beyond the stiff-metal handle of the wheel, as shown, thus forming a flexible connection between the hand-hold and the metal handle, which will give in all directions, thus insulating the hands of the rider from all jar.

Having thus described my invention, I claim—

1. The combination, with a handle-bar, of a flexible handle having its inner end connected with the bar, and a hand-hold wholly beyond the end of the bar, whereby a flexible connection is formed for the hand-hold, substantially as specified.

2. The combination, with a handle-bar, of a flexible handle having its inner end formed into a socket to receive the outer end of the bar and its outer end formed into a hand-hold beyond the said socket, whereby a flexible connection is formed between the socket and the hand-hold which yields in all directions, substantially as described.

3. The combination, with a handle-bar, of a flexible handle having its inner end formed into a socket to receive the outer end of the bar and its outer end into a hollow hand-hold, and a coiled wire within the hand-hold, substantially as set forth.

4. As a new article of manufacture, a handle for the purpose described, composed of flexible material, having its inner end formed into a socket to receive the end of a handle-bar and its outer end into a hand-hold beyond the socket, substantially as specified.

In testimony whereof I affix my signature in presence of two witnesses.

FRED E. YOUNGS.

Witnesses:
T. B. WYLIE,
ALANE N. BAMSTER.